(No Model.)
C. H. BOWEN.
TRACTION CABLE SYSTEM.
No. 343,293. Patented June 8, 1886.
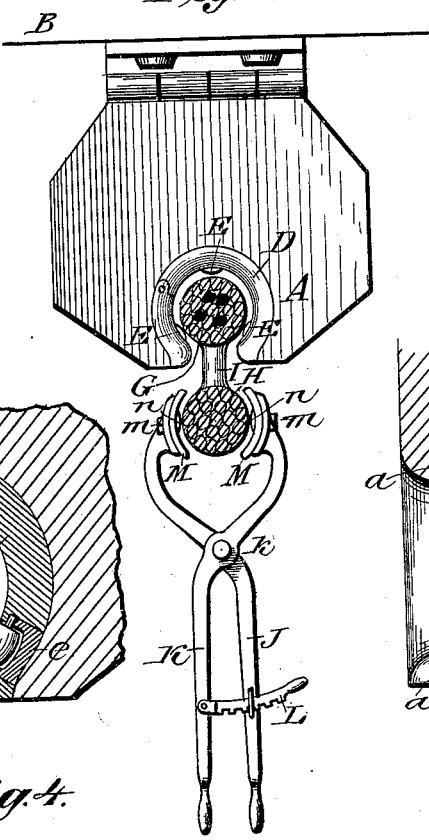
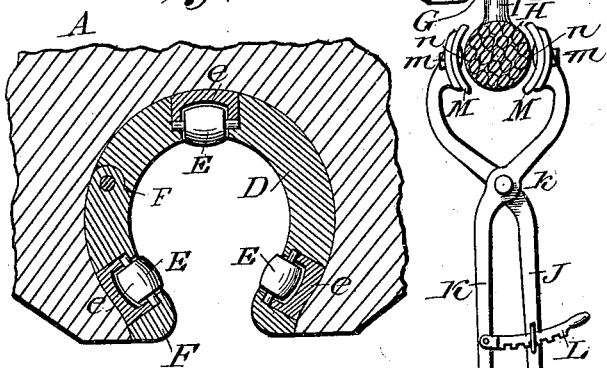
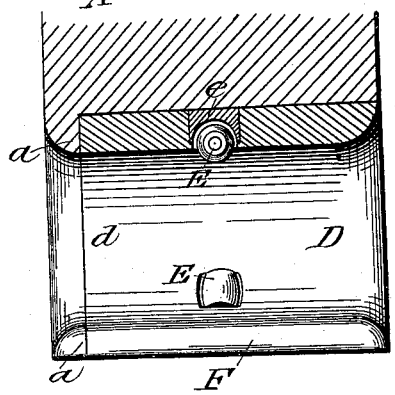
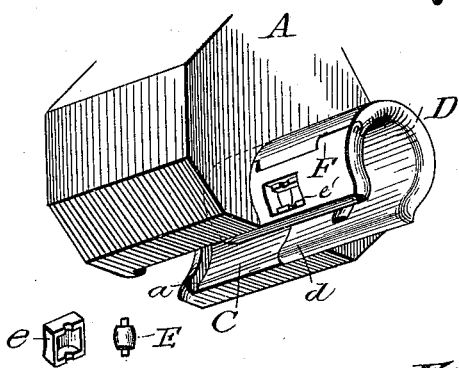
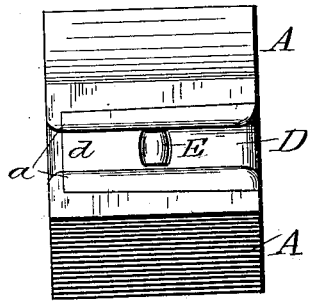
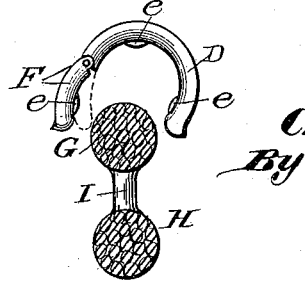
Witnesses.
Robert Everett
J. Gibbon
Inventor:
Charles H. Bowen
By
H. J. Ennis
Atty.

(No Model.)  6 Sheets—Sheet 2.
C. H. BOWEN.
TRACTION CABLE SYSTEM.
No. 343,293. Patented June 8, 1886.
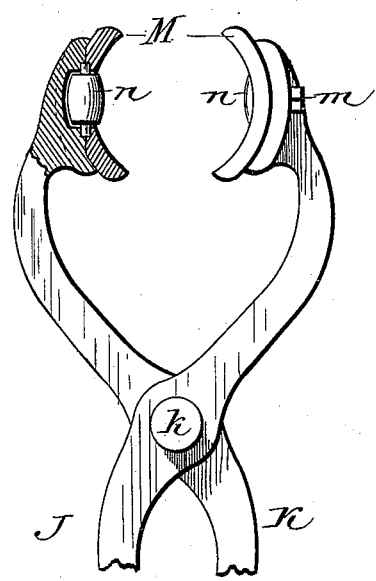
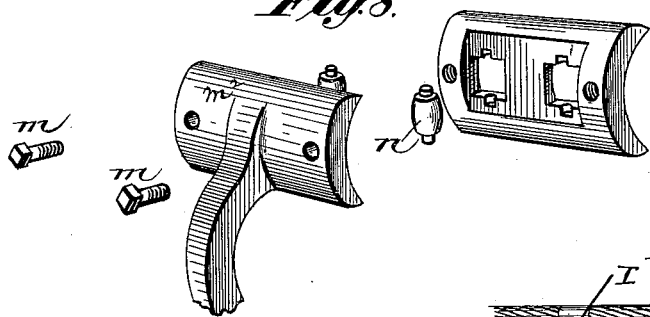
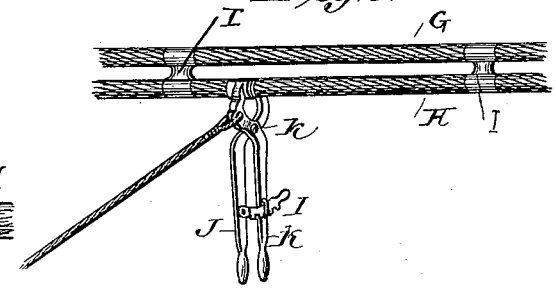
Witnesses.
Inventor:
Charles H. Bowen,
By H. A. Ennis
Atty.

(No Model.) 6 Sheets—Sheet 3.
C. H. BOWEN.
TRACTION CABLE SYSTEM.
No. 343,293. Patented June 8, 1886.
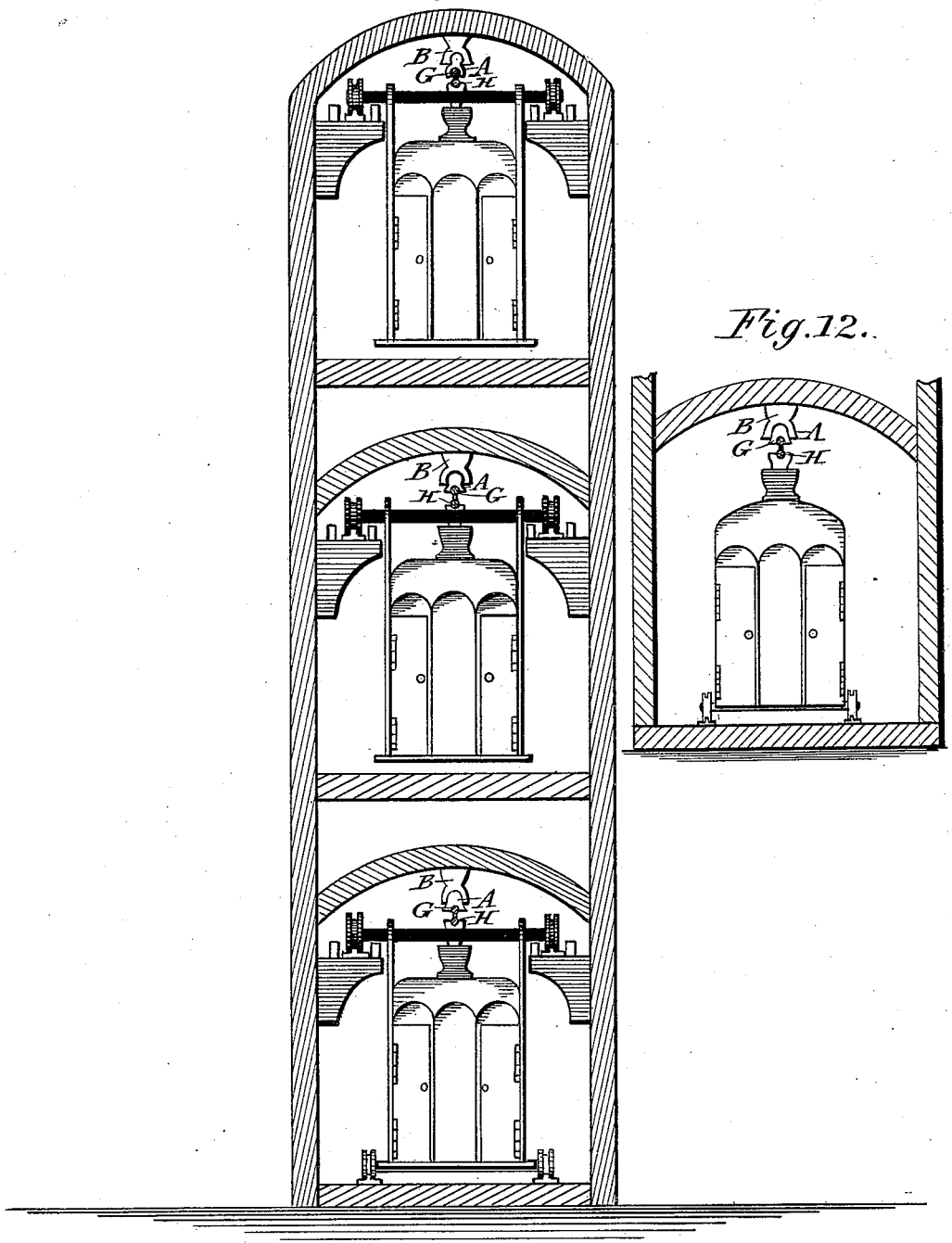

(No Model.)  
6 Sheets—Sheet 4.

C. H. BOWEN.
TRACTION CABLE SYSTEM.

No. 343,293. Patented June 8, 1886.

Attest  
B. C. Fenwick  
D. J. Gibson

Inventor  
Chas. H. Bowen  
H. J. Tunis Atty (No Model.) 6 Sheets—Sheet 6.
C. H. BOWEN.
TRACTION CABLE SYSTEM.
No. 343,293. Patented June 8, 1886.
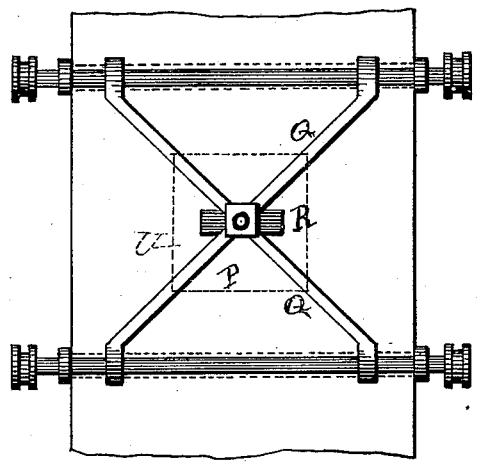
Fig. 15.
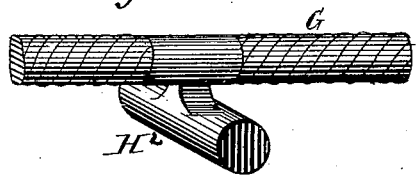
Fig. 16.
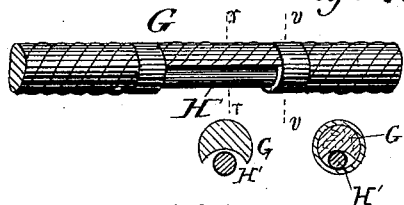
Fig. 17.
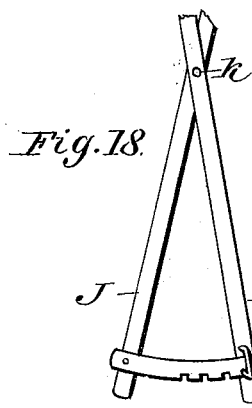
Fig. 18. Fig. 19.
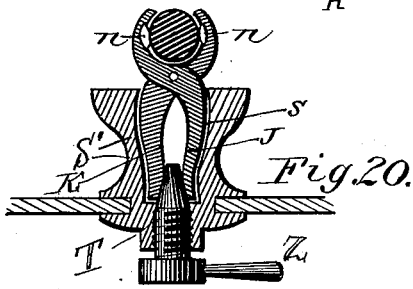
Fig. 20.
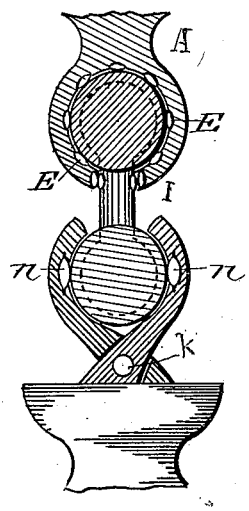
Witnesses:
B. C. Fenwick
D. J. Gibbon
Inventor:
Chas. H. Bowen
H. J. Ennis
Atty

UNITED STATES PATENT OFFICE.

CHARLES H. BOWEN, OF WASHINGTON, DISTRICT OF COLUMBIA.

TRACTION-CABLE SYSTEM.

SPECIFICATION forming part of Letters Patent No. 343,293, dated June 8, 1886.

Application filed November 21, 1885. Serial No. 183,492. (No model.)

*To all whom it may concern:*

Be it known that I, CHARLES H. BOWEN, a citizen of the United States, residing at Washington, in the District of Columbia, have invented certain new and useful Improvements in Traction-Cable Systems; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain improvements in a cable-transit system, to be operated by electricity or traction, and which is applicable to a variety of purposes.

The objects of my invention are, first, to provide a double cable supported in a suitable cable-way, having a hinged sleeve for engaging or disengaging the cable at will, and to permit the ready removal of the parts subjected to wear, when worn, as more fully hereinafter set forth; second, to provide an improved gripper having a gradually-increasing clamp action, and which will hold with great force when applied; third, to provide a safety device by which, should the gripper by any reason fail to become securely engaged with the cable, an attendant may engage the carriage to the cable by a rope, to prevent the same from running down a grade to destruction, and, fourth, to provide for operating the cable by electricity, all as more fully hereinafter specified.

The above-mentioned objects I attain by the means illustrated in the accompanying drawings, forming part of this specification, in which—

Figure 13:
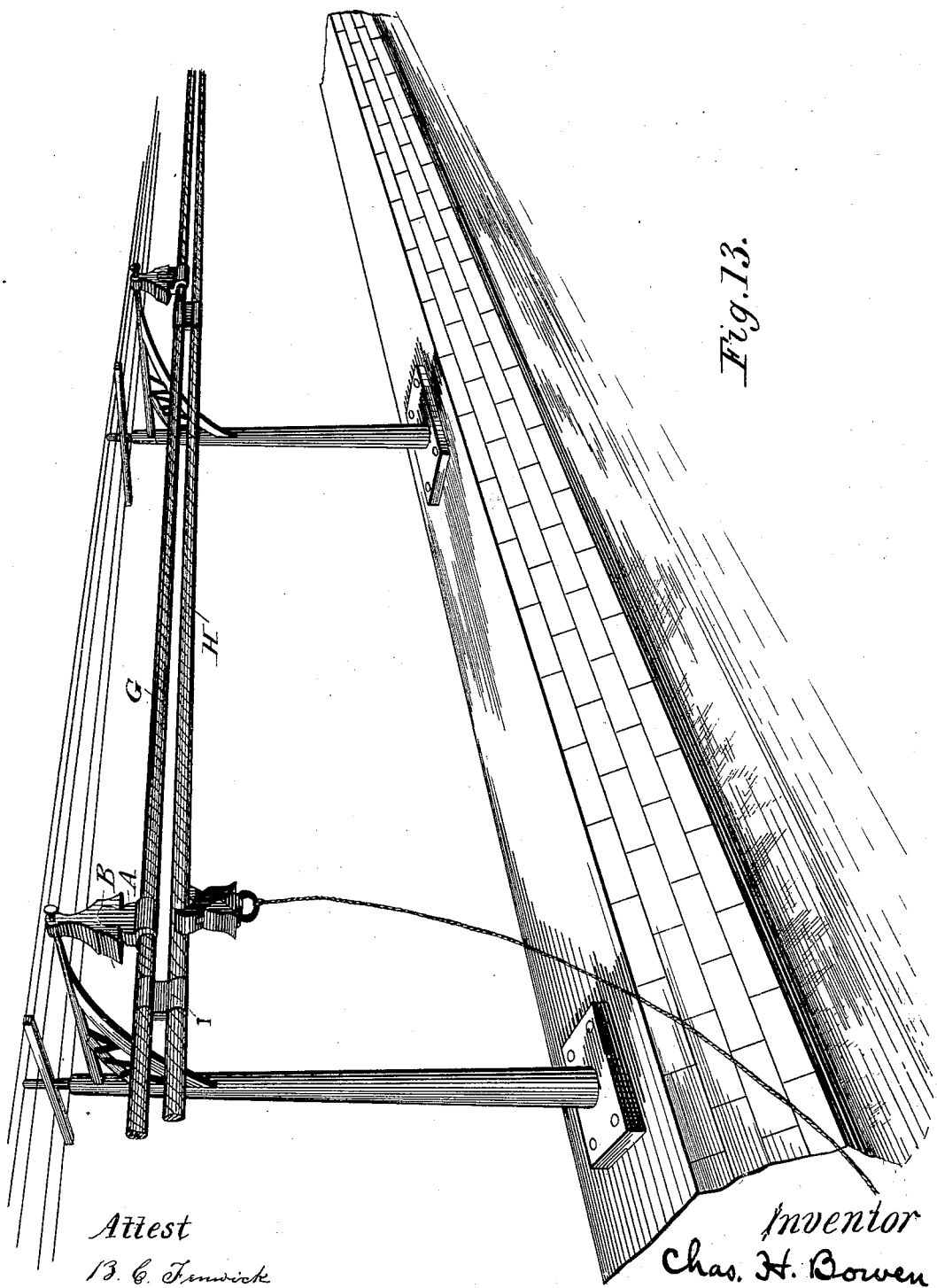
Figure 14:
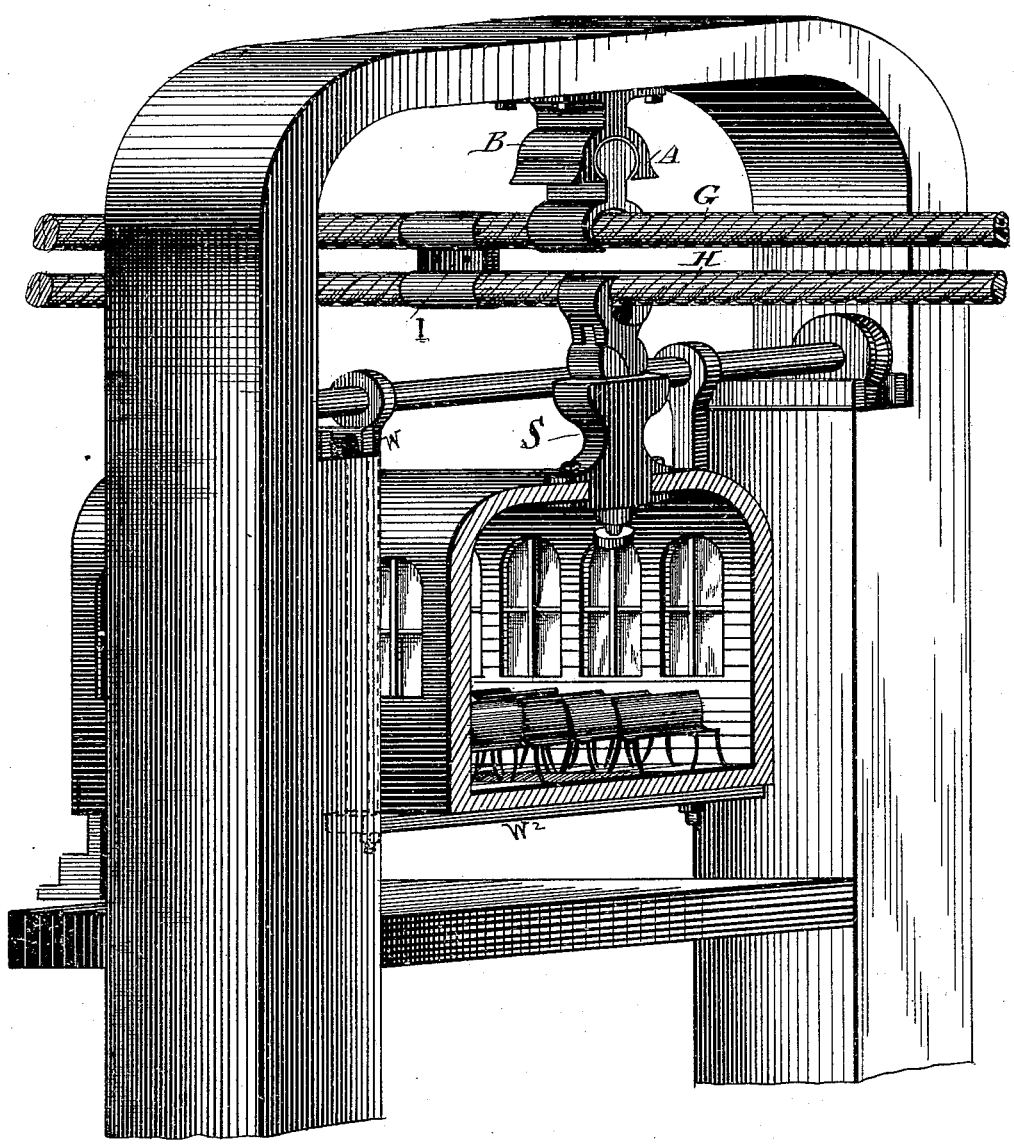

Figure 1 represents a view taken on the line of the cable, showing the cable in section with its supports, and a gripper in elevation locked upon the lower cable; Fig. 2, an enlarged cross-section of the cable-support; Fig. 3, a longitudinal section through one of the swinging pendants; Fig. 4, a perspective view of one of the pendants with its horseshoe-shaped sleeve partly withdrawn from the throat of the pendant; Fig. 5, a bottom view of the same; Fig. 6, a view showing the hinged sleeve when about to be engaged with the cable; Fig. 7, an enlarged view of the gripper, partly in section and partly in elevation; Fig. 8 a perspective view in detail of one of the gripper-jaws, showing the several parts detached from each other; Fig. 9, a perspective view showing the operative relations of the grip and cable; Fig. 10, a modification of the cable for the safety-grip; Fig. 11, a cross-section showing a system of suspended cars, in which my improved cable is operated by electricity or traction; Fig. 12, a cross-section of a system showing a car supported on a ground-track with the elevated cable, my invention contemplating either or both of the track systems shown, so that a change from a suspended track to a ground-track and vice versa, may be made at will to make the transit complete; Fig. 13, a perspective view showing my invention as applied to canal-transit purposes; Fig. 14, a perspective view of a car and the operating-cables. Fig. 15 is a view of the top of the car, and of the cross-rods which support the conical screw-gripper, and of the skylight in the car-roof; Fig. 16, a detached view of a transverse bar, $H^2$, constituting my safety device to be attached to the single or double cable, to be used when descending steep grades; Fig. 17, a modification of the device shown in Fig. 10; Fig. 18, a detail view of a modification of the grip-lever and rack-bar attachment; Fig. 19, a cross-section of the double cable, showing the gripper-jaws adjusted, with the disposition of the friction-rollers, and Fig. 20 a sectional view of a modification of the devices for locking the gripper-jaws, in which a conical screw is employed for the purpose.

Heretofore much difficulty has been experienced in this class of cables by reason of the cable-supports being liable to interfere with the grippers. To obviate this, I provide a double cable consisting of two wire ropes, G and H, connected at intervals by links I. The wire cable G is embraced by a hinged swinging pendant, A, while the cable H is at all times exterior to said pendant and free to be engaged by the gripper at any point. The pendant is hinged to an arm, pier, or other support, B, and each pendant has a slightly-tapering groove or throat, C, having at its smaller diameter an abutting-shoulder, $a$. The taper of the inclined groove or throat is slight, and it is arranged in the direction of the cable-travel, so that the travel of the cable will carry the sleeve D against the shoulder.

The sleeve D is a two-part device hinged at F, as shown in Figs. 4 and 6, and each part has one or more recesses, e, for receiving the friction-rollers E, which project more or less within the interior of the sleeve, and their journals have their bearings partly in the blocks e, which are fitted to the recesses e'. These rollers may be constructed of elastic material, such as vulcanized rubber; or their journals may be set in spring-bearings, so as to give them a yielding pressure, as indicated by the letter e, Fig. 2. The inclined sleeve D is readily removable for the displacement of worn rollers, or for the engagement or disengagement of the cable G, and the blocks e are fitted flush with the outer surface of the sleeve, so that the whole will enter the pendants A, the latter holding the rollers in place. (See Figs. 3, 4, and 6.)

The swinging pendants can be arranged with one, two, or three grooves, having corresponding sleeves and parallel cables, side by side, while the cables have corresponding grippers, which can be operated at will to grip onto any particular cable, the cables being run at different speeds, so as to cause the cars to travel fast or slow, as may be desired.

At suitable intervals along the plane of the cable H, I arrange safety-bars $H^2$, which are important in case the gripper becomes inoperative and the carriage is on a grade, in which case an attendant may throw a rope or chain over the bar $H^2$, and thus secure the car to the cable and prevent it from backing down the grade; or attachable and detachable loops may be arranged at will to engage or disengage this bar when the gripper becomes useless or inoperative.

Throughout the drawings I have illustrated an overhead cable; but it is evident my invention can be applied with equal advantage in an underground system.

My improved gripper is composed of cross-levers K J, said levers being pivoted together at k, forming jaw-arms, each of which carries a removable jaw-piece, M, as seen in Fig. 7. The jaw-pieces M fit to and embrace cable H, and rollers journaled partly in the heads $m^2$ project through the jaw-pieces, so as to be in contact with the cable. The pieces M are secured to the pieces $m^2$ by screws m, and when the parts are secured together elastic rollers n are housed within the jaws.

The rollers n, when the jaws are compressed, first engage the cable and allow the friction to be gradually increased, so as to gradually tighten the grippers onto the cable, thus allowing the car to be started without jerking or jarring, which would result otherwise. The body of the rollers may be made of elastic material—such as rubber or of wood, metal, or alloy—and the rollers mounted in elastic bearings, so as to press with an elastic pressure upon the cable.

The gripper is applied through and from the top of the car when the cable is elevated, or through the bottom of the car when an underground cable is used.

For most purposes the gripper shown in Fig. 1 will be sufficient, when the levers K J are forced apart to close the jaws upon the cable H, and with such construction I employ a rack-bar, L, to lock the gripper and maintain its force on the cable. In some instances, however, I prefer a more positive force, and to that end I force the gripper-jaws together by a conical screw operated by a suitable lever, as shown in Fig. 20. The levers K J are carried in the recess s in a block, S', set at the junction of the cross-bars Q, over the roof of the car or in other elevated position, so as to be readily applied, and the screw-rod T operates in the threaded aperture of such block to apply the gripper. With such a connection the lever Z allows a tremendous force to be applied to the gripper, and this force may be quickly applied and withdrawn.

Instead of having the cable H continuous, as shown in Fig. 9, it may be constructed with gripping-sections H', Figs. 10, 17, to which the grippers are applied. In such case the cable G would pass through the pendant A and the section H', exterior thereto, the sleeve passing into the throat c of the pendants, permitting the entire section H' to pass.

In case the lower cable, H, should break it is intended to use the upper cable, G, Fig. 17, which in that case is provided with parallel bars, upon which to catch the gripper. Of course it will be understood that the proportion of the various parts will be varied to correspond to the different uses to which the several parts are to be applied.

The cable G is made at intervals to conform to the form shown in Fig. 17, for travel as a single cable, in the event of the lower cable giving way or breaking or becoming inoperative. Further, these devices can be applied to single or double cables, as desired.

Instead of the arches shown in Figs. 11 and 12, I may employ piers having horizontal arms, as shown in Fig. 13, or suitable girders from which the pendants may swing; or the cable may be suspended from pendants supported from cross-section stays. The top of the car is provided with a square opening, U, for a skylight.

The track may be elevated at suitable points and distances, or it may be laid upon the ground at certain points—such as at street-crossings, for instance—the car being provided with two sets of wheels (see Figs. 11 and 12) and arranged to pass from one track to another at will, or, as occasion may require, from elevated wheels to surface-track wheels.

The gripper-cable may be applied to canal use, as seen in Fig. 13, and a short section of rope may be thrown over the cable to raise and lower the gripper in such canal system.

I have above described my invention mainly in relation to its employment in a traction system of travel; but by suitably insulating the pendants, their supports, or the cables themselves, the cables can be employed as electric conductors for conveying currents of electricity to operate mechanism for conveying the cars and for controlling and regulating the current in connection with suitable switching devices and circuit breaking and closing mechanism; or the cables thus insulated may be used as a line for the transmission of electric currents for various other purposes in connection with the transit system described.

Having thus described my invention, what I claim, and desire to secure by Letters Patent, is—

1. A compound or double cable united and combined with a swinging pendant-support, the pendants having open grooves at their lower edges, as described.

2. A cable provided with safety-clutches, to be engaged by a rope or chain from the car when the gripper fails to operate, as described.

3. A cable pendant-support, A, having a removable hinged sleeve, D, as described.

4. A cable-support, A, having a removable sleeve provided with elastic or spring-bearing friction-rollers $e$, which project within the interior of the sleeve, as described.

5. A pendant cable support having a removable sleeve with recesses for friction-rollers and blocks to hold the rollers in place in the walls of the pendant, as set forth.

6. The combination, with the pendant A, having recess C and shoulder $a$, of the hinged sleeve constructed to engage or hold the cable, and itself to be held in the recess by the travel of the cable, as set forth.

7. The combination, with the hinged pendant A, having a cylindrical recess, C, and the shoulder $a$, of the hinged sleeve D, the friction-rollers E, and the blocks $e$, as described.

8. A cable-gripper having removable jaw-pieces with friction-rollers, as described.

9. A gripper composed of cross-levers, both of which are operated simultaneously by a conical screw arranged vertically between the levers, for compressing the jaws together to clasp or grip the cable, as described.

10. The combination, with a cable and a car carrying a recessed block, S', of a gripper operated by a conical screw and lever, substantially as described.

11. The combination of the gripping-levers having heads $m^2$, the removable jaw-pieces provided with recesses, and the friction-rollers $n$, as set forth.

12. The cross-rods Q and block P, above the car, to hold the mechanism comprising the conical screw-gripper, as described.

13. A car with a window in its roof, in combination with a conical screw-gripper and its operating mechanism arranged within the car near the roof and at the intersection of the cross-rods Q, to enable the operator to observe the cable and gripper, as described.

In testimony whereof I affix my signature in presence of two witnesses.

CHARLES H. BOWEN.

Witnesses:
  D. J. GIBBON,
  H. J. ENNIS.